(12) United States Patent
Yu et al.

(10) Patent No.: US 9,481,006 B2
(45) Date of Patent: Nov. 1, 2016

(54) PLASTIC TUBULAR PRODUCT COATING MACHINE HEAD AND A PLASTIC TUBULAR PRODUCT COATING APPARATUS COMPRISING THE SAME

(71) Applicant: ZHEJIANG MENRED COMFORT SYSTEM CO., LTD, Wenzhou, Zhejiang (CN)

(72) Inventors: Dongming Yu, Beijing (CN); Linan Chen, Yueqing (CN)

(73) Assignee: ZHEJIANG MENRED COMFORT SYSTEM CO., LTD., Wenzhou, Zhejiang (CN)

( * ) Notice: Subject to any disclaimer, the term of this patent is extended or adjusted under 35 U.S.C. 154(b) by 238 days.

(21) Appl. No.: 14/356,467

(22) PCT Filed: Apr. 28, 2013

(86) PCT No.: PCT/CN2013/074925
§ 371 (c)(1),
(2) Date: May 6, 2014

(87) PCT Pub. No.: WO2014/117445
PCT Pub. Date: Aug. 7, 2014

(65) Prior Publication Data
US 2015/0151323 A1    Jun. 4, 2015

(30) Foreign Application Priority Data
Feb. 1, 2013    (CN) .......................... 2013 1 0039819

(51) Int. Cl.
| | | |
|---|---|---|
| B05C 3/12 | (2006.01) | |
| B05C 11/10 | (2006.01) | |
| B29C 47/00 | (2006.01) | |
| B29C 47/02 | (2006.01) | |
| B29C 47/04 | (2006.01) | |
| B29C 47/06 | (2006.01) | |
| B05C 13/02 | (2006.01) | |

(52) U.S. Cl.
CPC .................. *B05C 3/12* (2013.01); *B05C 11/10* (2013.01); *B05C 13/02* (2013.01); *B29C 47/0023* (2013.01); *B29C 47/021* (2013.01); *B29C 47/04* (2013.01); *B29C 47/065* (2013.01)

(58) Field of Classification Search
None
See application file for complete search history.

(56) References Cited

U.S. PATENT DOCUMENTS

| | | | | |
|---|---|---|---|---|
| 4,834,588 A | * | 5/1989 | Salter | ........................ B01J 3/02 406/14 |
| 5,132,549 A | | 7/1992 | Allan et al. | |
| 5,460,771 A | * | 10/1995 | Mitchell | ............. B29C 47/0023 264/151 |

FOREIGN PATENT DOCUMENTS

| | | |
|---|---|---|
| CN | 101332667 A | 12/2008 |
| CN | 202147376 U | 2/2012 |

OTHER PUBLICATIONS

Nov. 7, 2013 International Search Report issued in International Patent Application No. PCT/CN2013/074925.
Aug. 4, 2015 International Preliminary Report on Patentability issued in International Patent Application No. PCT/CN2013/074925.

* cited by examiner

*Primary Examiner* — Dah-Wei D Yuan
*Assistant Examiner* — Jethro M Pence
(74) *Attorney, Agent, or Firm* — Oliff PLC

(57) ABSTRACT

The invention disclosed a plastic tubular product coating machine head and a plastic tubular product coating apparatus including the same, plastic tubular product coating machine head includes a machine head body, a tubular product guiding sleeve and a fluid guiding plate, wherein, fluid guiding plate is in the shape of a circular plate with a central circular aperture, an annular channel is formed in circumferential direction on the outer periphery of the fluid guiding plate, a plurality of sub-channels extending from the outer periphery of the fluid guiding plate to the inner aperture wall of the fluid guiding plate are formed on both end faces of the fluid guiding plate, the sub-channels are tangent to the circumference of the central circular aperture, the main fluid passage is communicated to the sub-channels through the annular channel.

13 Claims, 2 Drawing Sheets

PLASTIC TUBULAR PRODUCT COATING MACHINE HEAD AND A PLASTIC TUBULAR PRODUCT COATING APPARATUS COMPRISING THE SAME

TECHNICAL FIELD

The present invention relates to processing machinery of macromolecular material plastic tubular product, particularly, relates to a plastic tubular product coating machine head used for coating modified layers on the outer wall of plastic tubular product.

BACKGROUND TECHNOLOGY

In order to enhance the performance of plastic tubular product and give it new functions, it often requires embellishing and processing of the outer surface of plastic tubular product, e.g. applying certain material coatings onto plastic tubular product so as to enhance its strength, toughness, elasticity modulus, oxygen resistance, anti-static property, fire resistance, etc.

In the extrusion coating apparatus of the prior art, when a modified polymer layer is coated onto plastic tubular product, the polymer melt flows in a direction parallel to the axis of the tubular product, and because the extrusion coating process is carried out in the state of extensional flow, the macromolecular chains of the polymer tend to form certain alignment along the axial direction of the tubular product, so that the axial strength of the tubular product is greater than its circumferential strength. According to stress analysis of pressure-bearing plastic tubular product, during its operational process, the stress generated circumferentially in the tube wall is more than twice the stress generated parallel to the tube axis in the tube wall, therefore, for ordinary pressure-bearing plastic tubular product, the circumferential direction with the greatest stress just happens to be the weakest direction of tube strength. This kind of anisotropy of strength is very unreasonable for tubular product used for transporting pressurized fluid.

Chinese patent literature CN101332667A disclosed an extrusion machine head for long glass fiber reinforced plastic tubular products, particularly an extrusion machine head for round plastic tubular products which is installed on a plastic extruder and has the characteristic of online spiral compounding, this apparatus has a device for glass fiber import and mixing dispersion of fiber in the melt, as well as a device for mandrel rotation, the mixing dispersion device of this machine head achieves that glass fiber with certain length which has been processed by coupling agent is imported into plastic melt which has already been plasticized, and that the glass fiber is evenly mixed into the plastic melt so as to form fiber-plastic mixed melt, and the mandrel rotation device of this machine head achieves by the rotation of the mandrel that the melt between the mandrel and the die cavity wall is changed from flowing in the axial direction of the mandrel to flowing in a spiral direction around the mandrel, until it solidifies. The polymer molecule and long glass fiber within the plastic tubular product extruded by the above-mentioned apparatus are aligned in the spiral direction around the axis, so that the circumferential strength of the tubular product is greatly enhanced.

However, the circumferential alignment of long glass fiber within the above-mentioned tubular product is achieved by the rotation of the mandrel in the die cavity, thus needs external driving power source and corresponding transmission means (such as a mandrel speed regulation chain wheel, a chain wheel holder for transmission of mandrel rotation, a transmission chain of mandrel rotation, a rotatable mandrel and a transmission driven chain wheel), which is both energy consuming and structurally complicated; moreover, the above-mentioned apparatus has an inevitable defect that, as the melt is rotated with the mandrel and is gradually pushed out of the die cavity so as to be cooled and molded, the rotation stress existing within the tube blank will maintain until the tubular product is cut apart, therefore, besides the necessary rectilinear motion, an unwanted rotation motion is added to the tubular product, which is not allowed in the extrusion molding process of all thermoplastic plastic tubular products; moreover, the melt temperature in the extrusion process of most plastic is about 200° C., some up to 400° C., the melt pressure in the extrusion process of plastic is up to several megapascal or several tens of megapascal, and the melt pressure of polymer added with glass fiber is even higher, which leads to difficulty of sealing between the mandrel and the bearing pedestal, therefore, it easily causes leakage of melt, negatively affect normal functioning of the equipment, adds to the labor intensity of the operator, and sometimes leads to damage of the equipment.

SUMMARY OF THE INVENTION

One objective of the present invention is to solve the technical problem that, in the prior art, the tubular product is rotated during extrusion, the structure of the machine head apparatus is complicated, the energy consumed is large, and the malfunction rate of operation is high, thus provides a plastic tubular product coating machine head which is structurally simple, consumes less energy, has low malfunction rate of operation, and does not need to rotate the tubular product.

For this purpose, the technical solution adopted by the present invention is a plastic tubular product coating machine head, comprising: a machine head body provided with a main fluid passage, an inserting groove and a tubular product outlet formed thereon; a tubular product guiding sleeve inserted into the machine head body through the inserting groove and provided with a tubular product passage formed therein; a fluid guiding plate in the shape of a circular plate with a central circular aperture; an annular channel formed in circumferential direction on the outer periphery of the fluid guiding plate; and a plurality of sub-channels extending from the outer periphery of the fluid guiding plate to the inner aperture wall of the fluid guiding plate, formed on both end faces of the fluid guiding plate, and tangent to the circumference of the central circular aperture; wherein, the inserting groove and the tubular product outlet are formed on the same axis, the axis of the main fluid passage is perpendicular to the axis of the inserting groove and the tubular product outlet; the main fluid passage is communicated to the sub-channels through the annular channel, the fluid guiding plate is placed within the inserting groove and between the machine head body and the tubular product guiding sleeve; the tubular product outlet, the tubular product passage and the fluid guiding plate are aligned on the same axis.

In the above-mentioned plastic tubular product coating machine head, the sub-channels formed on the two end faces of the fluid guiding plate are arranged in such an extending direction that they lead coating melt to flow in opposite directions on the tube wall of the tubular product.

In the above-mentioned plastic tubular product coating machine head, each sub-channel is a wedge-shaped channel whose width decreases from a first end to a second end, the first end of the wedge-shaped channel starts at the outer periphery of the fluid guiding plate, and the second end of the wedge-shaped channel terminates at the inner aperture wall of the fluid guiding plate.

In the above-mentioned plastic tubular product coating machine head, the second end of each wedge-shaped channel is tangent to the circumference of the inner aperture wall of the fluid guiding plate, and the arrangement of the wedge-shaped channels on the two end faces leads the coating melt to flow in opposite directions on the tube wall of the tubular product.

In the above-mentioned plastic tubular product coating machine head, the number and the dimension of the wedge-shaped channels on one end face of the fluid guiding plate is the same as that on the other end face of the fluid guiding plate.

In the above-mentioned plastic tubular product coating machine head, the thickness of the fluid guiding plate is no smaller than the inner diameter of the main fluid passage.

In the above-mentioned plastic tubular product coating machine head, the thickness of the fluid guiding plate is equal to the inner diameter of the main fluid passage.

The present invention also provides a plastic tubular product coating apparatus, which comprises a plurality of the above-mentioned plastic tubular product coating machine heads connected in series.

Compared to the prior art, the present invention has the following advantages:

1. The plastic tubular product coating machine head provided by the present invention comprises a machine head body, a tubular product guiding sleeve and a fluid guiding plate, which is structurally simple; during the coating process of plastic tubular product, as the extrusion pushing force of the extruder acts on the melt of the coating material, the melt enters the machine head through the main fluid passage and flows into the sub-channels through the annular channel on the fluid guiding plate, with the tubular product moves rectilinearly, the coating material that flows out of the sub-channels is coated onto the outer surface of the plastic tubular product along the circumferential direction. No extra power source is required, and energy consumption is reduced, the plastic tubular product coating machine head of the present invention eliminates the problem of material leaking, avoids waste of raw material, and reduces failure rate.
2. As the sub-channels on the two end faces of the fluid guiding plate are arranged in such an extending direction that they lead the coating melt to flow in opposite directions on the tube wall of the tubular product, the tangential forces acting on the tubular product to be coated counteract, so that no rotating motion of the tubular product will occur.
3. In the plastic tubular product coating machine head of the present invention, each sub-channel is a wedge-shaped channel which gradually narrows down, so that the flow velocity of the melt gradually accelerates during its flow from the first end of the wedge-shaped channel to the second end, so as to render that the fiber forming polymer in the in-situ compounding system forms fiber more easily, and that the macromolecular chains align in the flowing direction of the melt more easily.
4. In the plastic tubular product coating machine head of the present invention, the second end of each wedge-shaped channel is tangent to the circumference of the inner aperture wall of the fluid guiding plate, which ensures that the wedge-shaped channel is tangent to the outer wall of the plastic tubular product, so as to ensure that the macromolecular chains in the melt to be coated onto the outer wall of the tubular product are mostly perpendicular to the axis of the tubular product, as a result, their reinforcement effect in the circumferential direction of the tubular product is utilized to the maximal extent.
5. In the plastic tubular product coating machine head of the present invention, the wedge-shaped channels on the two end faces of the fluid guiding plate are arranged in opposite directions, that is, when viewed from the same direction, being clockwise tangent to the outer wall of the plastic tubular product and counterclockwise tangent to the outer wall of the plastic tubular product, respectively, which effectively counteracts and eliminates the tangential forces of opposite directions acted on the outer wall of the plastic tubular product by the melt of the coating material, so as to ensure that the plastic tubular product only moves rectilinearly, without any rotating motion.
6. When using the plastic tubular product coating machine head of the present invention to coat a plastic tubular product, as the melt of the coating material passes through the wedge-shaped channel, the fiber forming the component that is in-situ compounded therein forms fiber more easily, and the microfiber component or the rod-like macromolecular chains orderly align in the flowing direction of the melt in a better way, arrive at the outer wall of the plastic tubular product which only moves rectilinearly, and then weld along the circumferential direction of the plastic tubular product, so that as the processing mold temperature drops, the rigid rod-like macromolecular chains or the microfiber component freeze around the outer surface of the tubular product, as a result, the inhomogeneous performance of the material is fully utilized, wherein, the weak direction of material performance is applied in such direction where the requirement of tubular product performance is not so high, and the strong direction of material performance is applied in such direction where the requirement of tubular product performance is relatively high, thus the weak direction and strong direction of material performance is consistent with the stress direction of the tubular product, so as to allow the performance of the material to be most fully utilized, especially to enhance the circumferential strength of the tubular product. In addition, the macromolecular chains within the melt of the coating material align in an orderly way, which enhances the compactness of the material, with better insulation performance than alignment in an unordered way.
7. Since the coating and modification is performed on the surface of a plastic tubular product, the coating thickness can be adjusted by adjustment of corresponding dimensions of the fluid guiding plate.
8. The present invention also provides a plastic tubular product coating apparatus, which comprises a plurality of the plastic tubular product coating machine head connected in series, so as to form multiple layers of different functional modified coatings on the outer surface of the tubular product, thus to produce plastic tubular products with multi-layer structure.

BRIEF DESCRIPTION OF THE DRAWINGS

In order to make the present invention more easily and clearly understood, detailed description is further presented below, based on specific embodiments and with reference of accompanying drawings, wherein.

Figure 1:
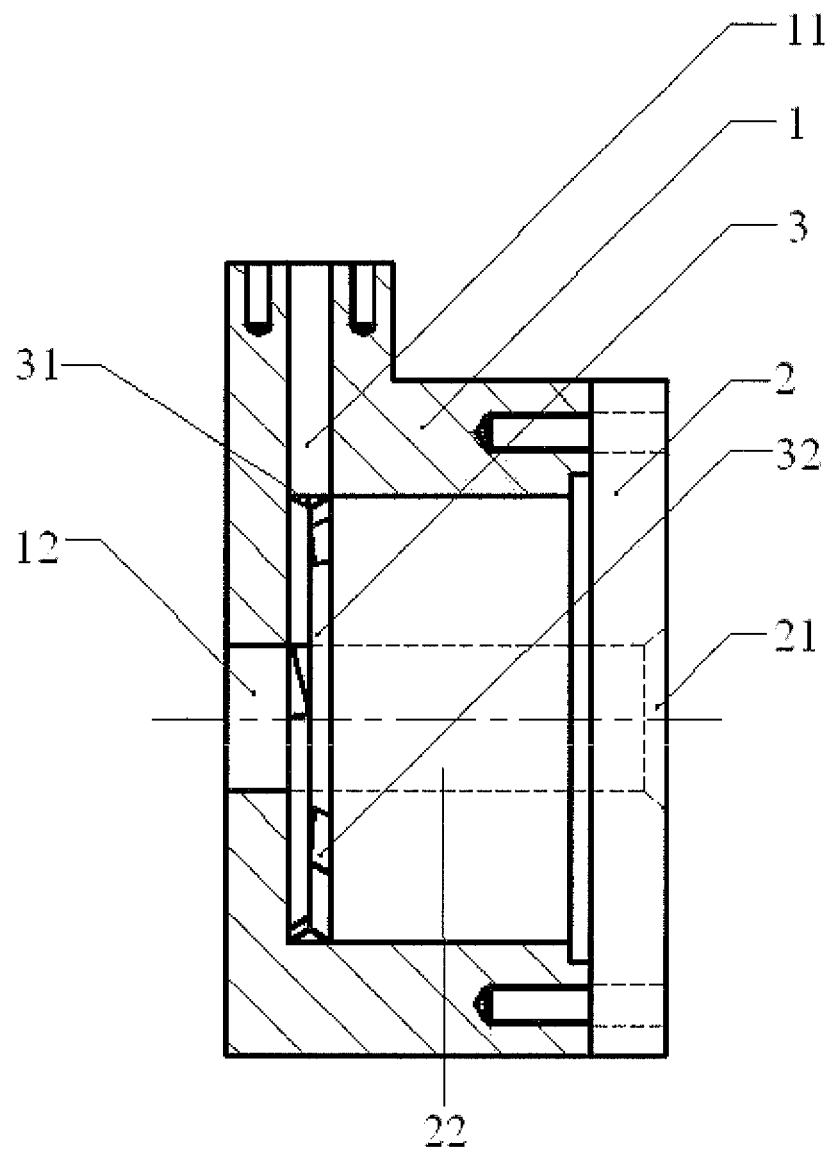
FIG. 1 shows the plastic tubular product coating machine head of one embodiment of the present invention.
Figure 2:
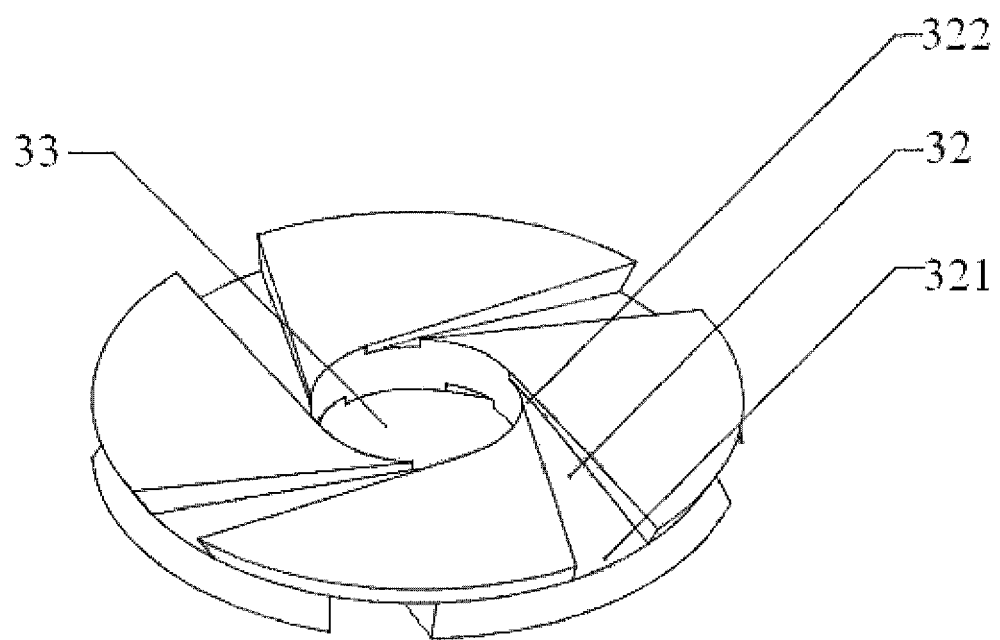
FIG. 2 shows the fluid guiding plate in the plastic tubular product coating machine head of one embodiment of the present invention.

Wherein, the markings in the accompanying drawings are explained as follows: 1—machine head body, 11—main fluid passage, 12—tubular product outlet, 2—tubular product guiding sleeve, 22—tubular product passage, 3—fluid guiding plate, 31—annular channel, 32—sub-channel, 321—first end, 322—second end, 33—passing aperture for tubular product

DETAILED DESCRIPTION OF THE PREFERRED EMBODIMENTS

A plastic tubular product coating machine head comprises a machine head body 1, a tubular product guiding sleeve 2 and a fluid guiding plate 3. A main fluid passage 11, an inserting groove and a tubular product outlet 12 are formed on the machine head body, the inserting groove and the tubular product outlet are formed on the same axis, the axis of the main fluid passage is perpendicular to the axis of the inserting groove and the tubular product outlet; the tubular product guiding sleeve 2 is inserted into the machine head body 1 through the inserting groove and provided with a tubular product passage 22 formed therein; the fluid guiding plate is in the shape of a circular plate with a central circular aperture, an annular channel 31 is formed in circumferential direction on the outer periphery of the fluid guiding plate, and four sub-channels 32 extending from the outer periphery of the fluid guiding plate to the inner aperture wall of the fluid guiding plate are respectively formed on both end faces of the fluid guiding plate, the sub-channels are tangent to the circumference of the central circular aperture; wherein, the main fluid passage 11 is communicated to the sub-channels 32 through the annular channel 31, the fluid guiding plate is placed within the inserting groove and between the machine head body and the tubular product guiding sleeve; the tubular product outlet, the tubular product passage and the fluid guiding plate are aligned on the same axis. The thickness of the fluid guiding plate is equal to the inner diameter of the main fluid passage, during operation of the plastic tubular product coating machine head, the tubular product enters the tubular product inlet 21, passes through the tubular product passage 22 and the passing aperture for tubular product 33 (i.e. the central circular aperture of the fluid guiding plate) on the same axis, comes out through the tubular product outlet 12, and keeps a certain speed to move rectilinearly, meanwhile, the melt of coating material extruded from the extruder flows into the machine head through the main fluid passage 11, and then flows into the sub-channels 32 through the annular channel 31, thus, by controlling the extrusion speed of the extruder so as to match the velocity of the melt flowing out of the sub-channels 32 with the speed of the rectilinear movement of the tubular product, the melt is coated onto the outer surface of the tubular product along the circumferential direction.

Based on the above-mentioned plastic tubular product coating machine head, each sub-channel is wedge-shaped with its width decreasing from the first end 321 to the second end 322, the first end of the wedge-shaped channel starts at the outer periphery of the fluid guiding plate, and the second end of the wedge-shaped channel terminates at the inner aperture wall of the fluid guiding plate.

As for the fluid guiding plate and as a further preferred embodiment, the number and the dimension of the wedge-shaped channels on one end face of the fluid guiding plate is the same as that on the other end face of the fluid guiding plate, and the wedge-shaped channels on the two end faces of the fluid guiding plate are arranged in opposite directions. That is, when viewed from the same direction, the several wedge-shaped channels on one end face of the fluid guiding plate are clockwise tangent to the outer wall of the plastic tubular product, and the several wedge-shaped channels on the other end face are counterclockwise tangent to the outer wall of the plastic tubular product. As a result, the tangential forces of opposite directions acted on the outer wall of the plastic tubular product by the melt of the coating material counteract, so as to ensure that the plastic tubular product only moves rectilinearly, without any rotating motion.

In the plastic tubular product coating machine head of the present invention, the number of the sub-channels on each end face may be five, six or more, depending on the conditions such as the performance of the coating material actually used and the performance of the plastic tubular product, as long as the coating requirements are met.

The present invention also provides a plastic tubular product coating apparatus, which comprises a plurality of the above-mentioned plastic tubular product coating machine heads connected in series, so as to achieve coating of plastic tubular products with multi-layer structure, wherein, each layer corresponds to one component respectively, with different performance or functions, and each component is supplied by one extruder, For example, by using one plastic tubular product coating machine head of the present invention, two-layered plastic tubes can be manufactured; by using two plastic tubular product coating machine heads of the present invention, three-layered plastic tubes can be manufactured, etc.

Obviously, the aforementioned embodiments are merely intended for clearly describing the examples, rather than limiting the implementation scope of the invention. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A plastic tubular product coating machine head, comprising:
    a machine head body, provided with a main fluid passage, an inserting groove and a tubular product outlet formed thereon;
    a tubular product guiding sleeve, inserted into said machine head body through said inserting groove and provided with a tubular product passage formed therein;
    a fluid guiding plate, in the shape of a circular plate with a central circular aperture;
    an annular channel, formed in circumferential direction on the outer periphery of said fluid guiding plate; and
    a plurality of sub-channels, extending from the outer periphery of the fluid guiding plate to the inner aperture wall of the fluid guiding plate, formed on both end faces of said fluid guiding plate with the sub-channels on one end face of the fluid guiding plate being tangentially connected to the circumference of the central circular aperture in a clockwise direction and the sub-channels on the other end face of the fluid guiding plate being tangentially connected to the circumference of the central circular aperture in a counter-clockwise direction such that the coating melts coming out of the sub-channels on the two end faces of the fluid guiding plate are guided to flow in opposite circumferential directions;

wherein, said inserting groove and said tubular product outlet are formed on the same axis, the axis of said main fluid passage is perpendicular to the axis of said inserting groove and said tubular product outlet;

said main fluid passage is communicated to said sub-channels through said annular channel, said fluid guiding plate is placed within said inserting groove and between said machine head body and said tubular product guiding sleeve; said tubular product outlet, said tubular product passage and said fluid guiding plate are aligned on the same axis.

2. The plastic tubular product coating machine head of claim 1, wherein, each said sub-channel is a wedge-shaped channel whose width decreases from a first end to a second end, said first end of said wedge-shaped channel starts at the outer periphery of said fluid guiding plate, and said second end of said wedge-shaped channel terminates at the inner aperture wall of said fluid guiding plate.

3. The plastic tubular product coating machine head of claim 2, wherein, the second end of each said wedge-shaped channel is tangent to the circumference of the inner aperture wall of said fluid guiding plate, and the arrangement of said wedge-shaped channels on the two end faces leads said coating melt to flow in opposite directions on the tube wall of the tubular product.

4. The plastic tubular product coating machine head of claim 3, wherein, the number and the dimension of said wedge-shaped channels on one said end face of said fluid guiding plate is the same as that on the other said end face of said fluid guiding plate.

5. The plastic tubular product coating machine head of claim 1, wherein, the thickness of said fluid guiding plate is no smaller than the inner diameter of said main fluid passage.

6. The plastic tubular product coating machine head of claim 2, wherein, the thickness of said fluid guiding plate is no smaller than the inner diameter of said main fluid passage.

7. The plastic tubular product coating machine head of claim 3, wherein, the thickness of said fluid guiding plate is no smaller than the inner diameter of said main fluid passage.

8. The plastic tubular product coating machine head of claim 4, wherein, the thickness of said fluid guiding plate is no smaller than the inner diameter of said main fluid passage.

9. The plastic tubular product coating machine head of claim 5, wherein, the thickness of said fluid guiding plate is equal to the inner diameter of said main fluid passage.

10. The plastic tubular product coating machine head of claim 6, wherein, the thickness of said fluid guiding plate is equal to the inner diameter of said main fluid passage.

11. The plastic tubular product coating machine head of claim 7, wherein, the thickness of said fluid guiding plate is equal to the inner diameter of said main fluid passage.

12. The plastic tubular product coating machine head of claim 4, wherein, the thickness of said fluid guiding plate is equal to the inner diameter of said main fluid passage.

13. A plastic tubular product coating apparatus, wherein, comprising a plurality of plastic tubular product coating machine heads of claim 1 connected in series.

* * * * *